May 4, 1965     C. L. MITCHELL     3,181,849
SHOCK ABSORBING GUARD
Filed Sept. 3, 1963
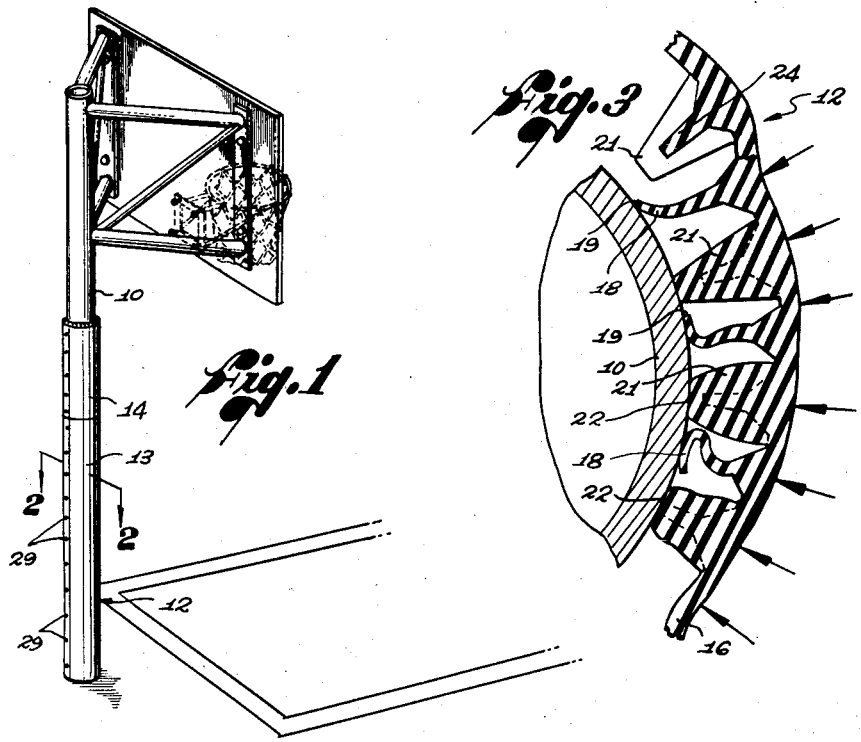
INVENTOR.
CHESTER L. MITCHELL
BY Fulwider, Patton, Rieber, Lee, and Utecht
ATTORNEYS though a wide variety of surface coverings have been suggested as a solution to the problem of providing shock absorbing ground surfaces, including mats made of resilient material, no suitable shock absorbing coverings have been provided to date by the prior art for the non-planar surface of various play equipment, such as the cylindrical surfaces of upstanding goal posts and the like.

United States Patent Office 3,181,849
Patented May 4, 1965

3,181,849
SHOCK ABSORBING GUARD
Chester L. Mitchell, Lakeview Terrace, Calif., assignor to Amerco Incorporated, Los Angeles, Calif., a corporation of California
Filed Sept. 3, 1963, Ser. No. 306,241
7 Claims. (Cl. 267—1)

This invention relates generally to resilient coverings, and more particularly to improvements in shock absorbing guards for preventing injuries to persons due to impact with hard surfaces.

The need for shock absorbing surface coverings is found principally in schoolyards, playgrounds, sports arenas and the like. In this connection, severe injuries have been caused to children and adults alike by sudden contact with hard surfaces, either upon the ground or upon various types of game equipment, while in the course of play. Although a wide variety of surface coverings have been suggested as a solution to the problem of providing shock absorbing ground surfaces, including mats made of resilient material, no suitable shock absorbing coverings have been provided to date by the prior art for the non-planar surface of various play equipment, such as the cylindrical surfaces of upstanding goal posts and the like.

A primary difficulty encountered in the design of shock absorbing coverings suitable for cylindrical surfaces has been the problem of providing an adequate shock absorption range for the covering. It will be apparent that, in a typical basketball game for example, individuals of different size and moving at different rates of speed may strike the goal post beneath the backet with widely variant levels of impact momentum. While an extremely resilient covering around the goal post may be sufficient to absorb the shock of a light impact, as from a small child moving at a low rate of speed, the same covering usually will not have sufficient shock absorbing capacity to protect a larger child moving at a greater rate of speed. On the other hand, a covering which offers sufficient resistance to effectively absorb the shock of a heavy impact may not possess comfortable shock absorbing characteristics for light impacts.

In other words, the shock absorption range of the surface coverings heretofore suggested have been too limited to prove effective under all conditions of service. Hence, those concerned with the development of safety devices for playground equipment and the like have long recognized the need for improved shock absorbing coverings having an extremely wide shock absorption range. The present invention fulfills this need.

Accordingly, it is an object of the present invention to provide a new and improved shock absorbing guard which overcomes the above and other disadvantages of the prior art.

Another object is to provide a new and improved shock absorbing covering capable of providing effective protection against injuries to persons coming in contact therewith over a wide range of shock magnitudes.

A further object of the invention is the provision of a shock absorbing guard characterized by a multi-stage shock absorbing facility to extend its shock absorbing range.

Still another object is to provide a relatively simple yet reliable multi-stage shock absorbing covering for cylindrical surfaces of goal posts and the like.

Yet another object of the present invention is the provision of a new and improved shock absorbing guard for cylindrical members, wherein protection against injuries over a wide range of shock magnitudes is effectively provided for a full 360 degrees about the circumference of the cylindrical surface.

The above and other objects and advantages of this invention will be better understood by reference to the following detailed description, when considered in connection with the accompanying drawing of an illustrative embodiment thereof, and wherein;

FIGURE 1 is a perspective view of a basketball goal post embodying a shock absorbing guard in accordance with the present invention;

FIGURE 2 is a sectional view, taken along the line 2—2 in FIGURE 1, and illustrates the construction of the shock absorbing guard, as well as the manner of its installation upon the goal post;

FIGURE 3 is an enlarged fragmentary view of the area 3 in FIGURE 2, and illustrates the reaction of the shock absorbing guard to impact;

FIGURE 4 is a fragmentary sectional view, taken along the line 4—4 in FIGURE 2; and FIGURE 5 is a fragmentary elevational view, taken along the line 5—5 in FIGURE 4.

Referring now to the drawing, and particularly to FIGURE 1 thereof, there is shown a basketball goal post 10 upon which a shock absorbing guard 12, in accordance with the present invention, has been installed. As will be observed in FIGURE 1, the shock absorbing guard 12 may comprise a plurality of coaxial cylindrical sections 13, 14 in end-to-end abutment with each other. The guard sections 13, 14 may be of the same or different height and may be stacked one above the other to cover any desired portion of the goal post 10.

Referring now more particularly to FIGURES 2–5, the shock absorbing guard 12 is in the form of a cylindrical pad which is preferably molded from a resilient, durable, weather resistant material such as a rubber composition or synthetic rubber product. However, it is to be understood that any other materials with sufficient resiliency, durability, and weather resistance may also be used, if desired, such as certain plastic materials or the like. Moreover, while the goal guard 12 assumes a cylindrical configuration subsequent to actual installation upon a post or like member, the guard is preferably molded in a substantially planar configuration and then wrapped around the member with which it is used to produce the cylindrical configuration shown in FIGURES 1–3.

To provide a relatively smooth outer surface for the guard 12, the outer portion of the guard comprises a solid surface layer 16. This surface layer 16 also provides an extremely durable outer surface insofar as weather and wear are concerned.

In order to provide the guard 12 with a sufficiently wide shock absorption range to adequately protect persons from injury due to either light or heavy impacts with the goal post 10, the guard embodies a three-stage shock absorbing means. The first stage of shock absorption is provided by a plurality of radial ribs 18 which are molded integral with and perpendicular to the inner face of the surface layer 16. The ribs 18 extend the full length of the guard 12 along axes which are parallel to the cylindrical axis of the guard. In this connection, when the guard 12 is in a flat configuration, prior to its installation upon the post 10, all of the ribs 18 are substantially parallel to one another. In addition, each of the ribs 18 is wider at the base and filleted into the surface layer 16 to structurally reinforce each rib. As best observed in FIGURE 2, the leading ends 19 of the ribs 18 contact the outer periphery of the goal post 10 and thus space the surface layer 16 of the guard 12 away from the outer surface of the post.

The second stage of shock absorption is provided by a series of frusto-conical protuberances or bosses 21 located between pairs of adjacent ribs 18 and extending in rows along the length of the guard 12, the rows extending parallel to the cylindrical axis of the guard. The conical axis of each of the frusto-conical bosses 21 is perpendicular to the surface layer 16 of the guard and extends radially to the cylindrical axis of the guard when the guard is installed upon the goal post 10. The frustum end surface 22 of each boss 21 is spaced away from the outer surface of the post 10 and does not ordinarily contact the latter except in the case of a substantial impact to the guard sufficient to extensively deform the ribs 18.

The third stage of shock absorption by the guard 12 is provided by a plurality of resilient longitudinal and radial ribs 24, molded integral with and perpendicular to the inner face of the surface layer 16. Each rib 24 extends the full length of the guard 12, parallel to the cylindrical axis thereof, and intersects all of the bosses 21 of a single row. The ribs 24 essentially duplicate the radial ribs 18, but are shorter in height and are spaced a distance behind the frustum faces 22 of the bosses 21 which they intersect. Hence, the outer periphery of the goal post 10 cannot contact the ribs 24 without first deforming the ribs 18 and bosses 21. In addition to providing the third stage of shock absorption, the radial ribs 24 reinforce and enhance the lateral stability of the bosses 21.

In order to secure the guard 12 in its cylindrical wrap-around configuration upon the goal post 10, the ends of the guard are each provided with a rigid plate 26, 27, respectively, molded into the surface layer 16 so that the plates are not exposed to the outer surface. The plates 26, 27 are provided with appropriately threaded holes to receive a plurality of screws 29 passing through both plates and recessed below the outer surface of the guard 12. In this connection, the two plates 26, 27 are at an angle to each other, so that any forces tending to pull the plates apart and break open the guard 12 will produce a wedging action causing the screw 29 to bind and resist separation of the plates. It will also be apparent in FIGURE 2 that, since all of the attachment hardware is recessed below the outer surface of the guard 12, the danger of injury to persons striking the guard in the vicinity of the attachment hardware is effectively minimized. Hence, a 360° field of protection is provided.

Referring now particularly to FIGURE 3, the shock absorbing action of the guard 12 is as follows. In the case of a light impact to the outer surface of the surface layer 16, the radial ribs 18 of the guard are compressed and thereby deform until the shock is absorbed. This deformation of the radial ribs 18 brings the frustum faces 22 of the bosses 21 closer to the outer periphery of the goal post 10. However, unless the shock is of great magnitude, the deformation of the radial ribs 18 alone will be sufficient to completely absorb the shock. These conditions constitute the first stage of shock absorption.

When an impact of greater magnitude occurs at the outer surface of the guard 12, the radial ribs 18 are deformed to such an extent that the frustum faces 22 of the bosses 21 in the impact vicinity are forced into direct contact with the cylindrical surface of the goal post 10. Depending upon the magnitude of the shock, the frusto-conical bosses 21 are progressively compressed and widen or bulge to present progressively increasing resistance. These conditions constitute the second stage of shock absorption.

In the event of a very high level impact, the radial ribs 18 and bosses 21 will all be compressed to the point where the outer surface of the goal post 10 will contact the radial reinforcing ribs 24. These latter ribs add additional resistance to that already provided by the bosses 21 and ribs 18, and thereby constitute the third stage of shock absorption.

The aforedescribed arrangement provides a goal guard having an extremely wide range of shock absorbing capability, and is equally effective in protecting persons against injury from either light or heavy impacts.

It will be apparent from the foregoing that, while a particular form of my invention has been illustrated and described, various modifications can be made without departing from the spirit and scope of my invention. Accordingly, I do not intend that my invention be limited, except as by the appended claims.

I claim:
1. A shock absorbing guard, comprising:
a resilient base layer having an inner face and a smooth outer face;
a plurality of resilient, longitudinal first ribs substantially parallel to one another and extending perpendicular to said inner face of said base layer;
a plurality of resilient frusto-conical bosses between said first ribs and extending from said inner face of said base layer, said bosses extending a shorter distance away from said inner face than said first ribs;
and a plurality of resilient, longitudinal second ribs extending from said inner face of said base layer, each of said second ribs extending between a pair said first ribs and intersecting a plurality of said bosses, each of said second ribs extending a shorter distance away from said inner face than said bosses.

2. A shock absorbing covering for cylindrical surfaces, comprising:
a resilient, cylindrical base layer having an inner face and an outer face;
first resilient, radially extending rib means integral with said inner face for absorbing a first degree of shock;
resilient boss means integral with said inner face for absorbing a second degree of shock greater than said first degree of shock, said boss means extending a lesser distance away from said inner face than said first resilient rib means;
and second resilient, radially extending rib means integral with said inner face for absorbing a third degree of shock greater than said second degree of shock, said second rib means extending a shorter distance away from said inner face than said boss means.

3. A shock absorbing guard, comprising:
a resilient, cylindrical base layer having an inner face and a smooth outer face;
a plurality of radially extending, longitudinal ribs having parallel longitudinal axes and integral with said inner face of said base layer for absorbing a first degree of shock by undergoing distortion;
and a plurality of frusto-conical bosses integral with said inner face of said base layer and located between said ribs for absorbing a second degree of shock greater than said first degree of shock, the frustum surfaces of each of said bosses being spaced a lesser distance away from said inner face than the outermost ends of said ribs.

4. A shock absorbing guard, comprising:
a resilient, solid base layer having an inner face and a smooth outer surface;
a plurality of spaced apart, resilient, frusto-conical bosses arranged in parallel rows, the conical axis of each boss being perpendicular to the inner face of said solid layer and integral therewith;
a plurality of first resilient, longitudinal ribs parallel to said rows of bosses and extending perpendicular to said inner face of said solid layer and integral therewith, said first longitudinal ribs being spaced between said rows of bosses and normally extending further away from said inner face than said bosses;
and a plurality of second resilient, longitudinal ribs parallel to said first longitudinal ribs, each of said second ribs intersecting all of the bosses of one of said rows and extending perpendicular to the inner face of said base layer and integral therewith, each of said second longitudinal ribs extending a shorter distance away from said inner face than said bosses when said bosses are in their normally uncompressed state.

5. Apparatus as set forth in claim 4, including recessed attachement means within said solid base layer for securing said layer in a cylindrical configuration.

6. A shock absorbing covering for cylindrical surfaces, comprising:

a resilient, cylindrical base layer having an inner face and a smooth outer face;

a plurality of spaced apart, resilient, radially extending frusto-conical bosses arranged in rows, the conical axis of each boss being perpendicular to said inner face of said base layer;

a plurality of first resilient, longitudinal, radially extending ribs perpendicular to said inner face of said base layer, said first longitudinal ribs being spaced between said rows of bosses and normally extending further away from said inner face than said bosses;

and a plurality of second resilient, longitudinal, radially extending ribs, each of said second ribs being located between a pair of said first ribs, each of said second ribs intersecting all of the bosses of one of said rows and extending perpendicular to the inner face of said base layer, each of said second longitudinal ribs extending a shorter distance away from said inner face than said bosses when said bosses are in their normally uncompressed state.

7. A shock absorbing covering, comprising:

a resilient base layer;

first resilient rib means integral with said base layer for absorbing a first degree of shock by undergoing distortion;

a plurality of bosses integral with said base layer for absorbing a second degree of shock greater than said first degree, said bosses extending a lesser distance away from said base layer than said first resilient rib means;

and second resilient rib means integral with said base layer for absorbing a third degree of shock greater than said second degree, said second rib means intersecting only said bosses and extending a lesser distance away from said base layer than said bosses.

References Cited by the Examiner

UNITED STATES PATENTS

| 2,188,815 | 1/40 | Murphy | 20—69 |
| 2,440,150 | 4/48 | Mitchell | 267—63 X |
| 2,730,356 | 1/56 | Hunter | 267—63 |
| 2,739,358 | 3/56 | Kunkel | 20—69 |
| 2,980,449 | 4/61 | Dunton | 277—208 X |
| 3,104,875 | 9/63 | Doyle | 267—1 |
| 3,119,624 | 1/64 | Freed | 277—208 X |

FOREIGN PATENTS

| 10,615 | 1889 | Great Britain. |
| 333,251 | 8/30 | Great Britain. |

ARTHUR L. LA POINT, *Primary Examiner.*